US006735047B1

(12) United States Patent
Hasegawa et al.

(10) Patent No.: US 6,735,047 B1
(45) Date of Patent: May 11, 2004

(54) MAGNETIC HEAD AND MAGNETIC RECORDING/REPRODUCING APPARATUS

(75) Inventors: Kenji Hasegawa, Hirakata (JP); Shunsaku Muraoka, Hirakata (JP); Akinaga Natsui, Sakai (JP); Koichi Osano, Osaka (JP); Ken Takahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 86 days.

(21) Appl. No.: 10/110,517

(22) PCT Filed: Oct. 10, 2000

(86) PCT No.: PCT/JP00/07038

§ 371 (c)(1), (2), (4) Date: Apr. 11, 2002

(87) PCT Pub. No.: WO01/27914

PCT Pub. Date: Apr. 19, 2001

(30) Foreign Application Priority Data

Oct. 14, 1999 (JP) ........................................ 11/292955

(51) Int. Cl.[7] ........................................ G11B 5/147

(52) U.S. Cl. ........................................ 360/126

(58) Field of Search ........................................ 360/125, 126, 360/121, 32

(56) References Cited

U.S. PATENT DOCUMENTS

| | | | | |
|---|---|---|---|---|
| 5,202,806 A | | 4/1993 | Kawase | |
| 5,208,971 A | | 5/1993 | Muraoka et al. | |
| 5,218,500 A | | 6/1993 | Okuda et al. | |
| 5,426,550 A | | 6/1995 | Mizoh et al. | |
| 5,515,222 A | | 5/1996 | Kumagai et al. | |
| 5,835,673 A | * | 11/1998 | Yamada et al. | 360/32 |
| 5,875,081 A | | 2/1999 | Suzuki et al. | |
| 6,016,243 A | | 1/2000 | Nihei et al. | |
| 6,136,459 A | * | 10/2000 | Nihei et al. | 360/126 |
| 6,549,369 B1 | * | 4/2003 | Masuda et al. | 360/126 |

FOREIGN PATENT DOCUMENTS

| | | |
|---|---|---|
| JP | 60-129912 A | 7/1985 |
| JP | 6-111222 A | 4/1994 |
| JP | 6-243414 A | 9/1994 |
| JP | 7-21513 A | 1/1995 |
| JP | 7-85290 | 9/1995 |
| JP | 8-171706 | 7/1996 |
| JP | 8-203015 A | 8/1996 |
| JP | 10-302213 A | 11/1998 |
| JP | 11-273031 A | 10/1999 |

OTHER PUBLICATIONS

S.E.Kadijk and A.Broese Van Groenou, "Wear Anisotropy of MnZn Ferrite, Part I: Recorder and Sphere–on–tape Experiments" pp. 93–113.

* cited by examiner

*Primary Examiner*—Allen Cao
(74) *Attorney, Agent, or Firm*—Merchant & Gould P.C.

(57) ABSTRACT

A magnetic head that is less prone to wear and has a long still duration and a magnetic recording/reproducing apparatus including a high-speed rotary drum unit using the same are provided. Thus, in a magnetic head including two magnetic core halves 4 and 8, each including at least one magnetic film 2, 6 made of a soft magnetic metallic material and a pair of substrates 1, 3 and 5, 7 sandwiching the magnetic film, arranged so that end faces thereof oppose each other with a magnetic gap 9 being formed therebetween to form a magnetic path by the magnetic film in each of the magnetic core halves, at least a part of a sliding surface of each substrate with respect to a magnetic tape is made of a non-magnetic single crystal ferrite material and a crystal face orientation of the non-magnetic single crystal ferrite material at the sliding surface is set to be approximately {110} while a <110> direction of the non-magnetic single crystal ferrite material is approximately in parallel with a sliding direction of the magnetic head with respect to the magnetic tape.

7 Claims, 6 Drawing Sheets

MAGNETIC HEAD AND MAGNETIC RECORDING/REPRODUCING APPARATUS

TECHNICAL FIELD

The present invention relates to a magnetic head and a magnetic recording/reproducing apparatus using the same. More specifically, the present invention relates to a magnetic head suitable for a high-definition VTR and digital VTR efficiently recording/reproducing a large amount of signals, a streamer recording/reproducing digital data, and the like and to a recording/reproducing apparatus using this magnetic head.

BACKGROUND ART

As a magnetic head with excellent high-frequency characteristics to be mounted on a videotape recorder (hereinafter, referred to as "VTR"), streamer, etc., a magnetic head has been developed that includes a magnetic core obtained by alternately laminating magnetic metal films and non-magnetic films. One example of such a magnetic head is a so-called multilayer magnetic head. The multilayer magnetic head includes magnetic core halves in which a laminated magnetic film, including soft magnetic metal films made of a Co-based amorphous alloy and non-magnetic films made of $SiO_2$, is sandwiched between a pair of non-magnetic substrate materials and the magnetic core halves are arranged so that the end faces thereof oppose each other to form a magnetic gap therebetween. As the non-magnetic substrate materials, ceramics based on magnesium titanate, calcium titanate, or the like are used.

On the other hand, the VTR and streamer are getting smaller and more compact. Accordingly, a drum unit on which the magnetic head is mounted is being adapted to have a smaller size and higher rotational speed and a magnetic tape is being adapted to be thinner. For example, in a VHS-format VTR, the drum unit has a diameter of 62 mm and a relative velocity of 5.8 m/s and the magnetic tape has a thickness of about 18 $\mu$m. In contrast, in a DV (digital video)-format or DVCPRO-format VTR, the drum unit has a diameter of 21.7 mm and a relative velocity of 10 m/s or more and the magnetic tape has a thickness of 10 $\mu$m or less. The magnetic tape in the DV-format or DVCPRO-format is more susceptible to damage as compared with that in the conventional VHS-format or the like because its stiffness is reduced due to the reduction in thickness and the thickness of the magnetic layer is also reduced.

Further, in the VTR, there is a mode in which the magnetic tape is made to pause before recording/reproducing (hereinafter, referred to as "still mode"). During the still mode, the magnetic head is kept sliding on the same position of the magnetic tape. In a consumer VTR, to avoid damage to the magnetic head and magnetic tape, the VTR is designed so that the still mode is released or the tape tension is reduced after a certain period of time has elapsed from the time the still mode is started. However, in commercial and broadcast VTRs, the still mode may be maintained for a long time in preparation for news gathering or broadcasts, and in addition, it is required that a high-definition image is record/reproduced immediately after the still mode is released. Thus, there has been a demand for a magnetic recording/reproducing apparatus that does not damage the magnetic head or magnetic tape even when the still mode is maintained for a long time. In general, a still duration, which is the time required from the time the still mode is started until the reproduction output from the magnetic head decreases to a predetermined value, is used to evaluate still characteristics.

Examples of a conventional magnetic head using a non-magnetic single crystal All ferrite material include the one disclosed in JP 7(1995)-21513 A. This magnetic head is a multilayer magnetic head in which a non-magnetic single crystal ferrite material is used as a substrate material and the face orientation of the ferrite material at the sliding surface with respect to a magnetic tape is set to be {100}.

However, when the conventional multilayer magnetic head using a ceramic substrate is mounted on a high-speed rotary drum of the VTR or streamer, such problems occur as the magnetic head wearing considerably and having a short still duration.

Further, in a combination-type magnetic head in which two magnetic heads are mounted on one head base, there has been a problem in that the higher the relative velocity of the magnetic heads and magnetic tape, the greater the amount of wear in the magnetic head coming into contact with the tape first becomes as compared with that in the other magnetic head.

Furthermore, in the multilayer magnetic head using a non-magnetic single crystal ferrite substrate, when the crystal face orientation of the non-magnetic single crystal ferrite substrate at the sliding surface with respect to a magnetic tape is set to be {100}, there arises a problem of the magnetic head having a short still duration although the wear resistance thereof is improved.

DISCLOSURE OF INVENTION

Therefore, an object of the present invention is to provide a magnetic head that is less prone to wear and has a long still duration and a magnetic recording/reproducing apparatus including a high-speed rotary drum unit using the same.

In order to achieve the above object, a first magnetic head according to the present invention includes magnetic core halves, each including at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves, wherein at least a part of a sliding surface of each substrate with respect to a magnetic tape is made of a non-magnetic single crystal ferrite material, a crystal face orientation of the non-magnetic single crystal ferrite material at the sliding surface is approximately {110}, and a <110> direction of the non-magnetic single crystal ferrite material is approximately in parallel with a sliding direction of the magnetic head with respect to the magnetic tape.

In order to achieve the above object, a second magnetic head according to the present invention includes magnetic core halves, each including at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves, wherein at least a part of a sliding surface of each substrate with respect to a magnetic tape is made of a non-magnetic single crystal ferrite material, a crystal face orientation of the non-magnetic single crystal ferrite material at the sliding surface is approximately {110}, and a <100> direction of the non-magnetic single crystal ferrite material is approximately in parallel with a sliding direction of the magnetic head with respect to the magnetic tape.

In order to achieve the above object, a third magnetic head according to the present invention is a magnetic head in which at least one first magnetic head and at least one second magnetic head described above are mounted on one head base.

In this third magnetic head, it is preferable that the second magnetic head is arranged so that it comes into contact with a magnetic tape prior to the other magnetic head.

In order to achieve the above object, a first magnetic recording/reproducing apparatus according to the present invention includes a rotary drum unit having the first magnetic head, and a guide and contact mechanism for guiding a magnetic tape into the rotary drum unit and keeping the magnetic tape in contact with outer peripheral surfaces of a fixed drum and a rotary drum.

In order to achieve the above object, a second magnetic recording/reproducing apparatus according to the present invention includes a rotary drum unit having the second magnetic head, and a guide and contact mechanism for guiding a magnetic tape into the rotary drum unit and keeping the magnetic tape in contact with outer peripheral surfaces of a fixed drum and a rotary drum.

In order to achieve the above object, a third magnetic recording/reproducing apparatus according to the present invention includes a rotary drum unit having the third magnetic head, and a guide and contact mechanism for guiding a magnetic tape into the rotary drum unit and keeping the magnetic tape in contact with outer peripheral surfaces of a fixed drum and a rotary drum.

According to the above configurations, since the non-magnetic single crystal ferrite substrate has a smaller surface roughness as compared with the conventional ceramic substrate, it is less prone to damage the magnetic tape when it slides thereon. In addition, since the non-magnetic single crystal ferrite substrate is superior to the conventional ceramic substrate in terms of wear resistance, it can extend the lifetime of the magnetic head.

Further, even when the same non-magnetic single crystal ferrite substrate is used, characteristics such as a wear rate and still duration can be varied by changing the combination of the crystal face orientation and crystal direction. Thus, the crystal face orientation and direction of the sliding surface of the magnetic head can be selected depending on an application purpose.

As described above, a magnetic head that has a long still duration and is less prone to damage a magnetic tape can be provided by using a non-magnetic single crystal ferrite as a non-magnetic substrate material in the multilayer magnetic head and setting the crystal face orientation of the ferrite at the sliding surface to be contacted with the magnetic tape to be approximately {110} and the <110> direction thereof to be approximately in parallel with a sliding direction of the magnetic head with respect to the magnetic tape, or alternatively, setting the crystal face orientation of the ferrite at the sliding surface to be contacted with the magnetic tape to be approximately {110} and the <100> direction thereof to be approximately in parallel with a sliding direction of the magnetic head with respect to the magnetic tape. Also, since the magnetic head according to the present invention has an excellent wear resistance, a reliable magnetic recording/reproducing apparatuses can be provided.

BRIEF DESCRIPTION OF DRAWINGS

FIG. 3(*b*) is a side view illustrating the configuration of a magnetic head according to Embodiment 3 of the present invention.

BEST MODE FOR CARRYING OUT THE INVENTION

Hereinafter, a magnetic head according to preferable embodiments of the present invention will be described with reference to the drawings.

Embodiment 1

Figure 1:
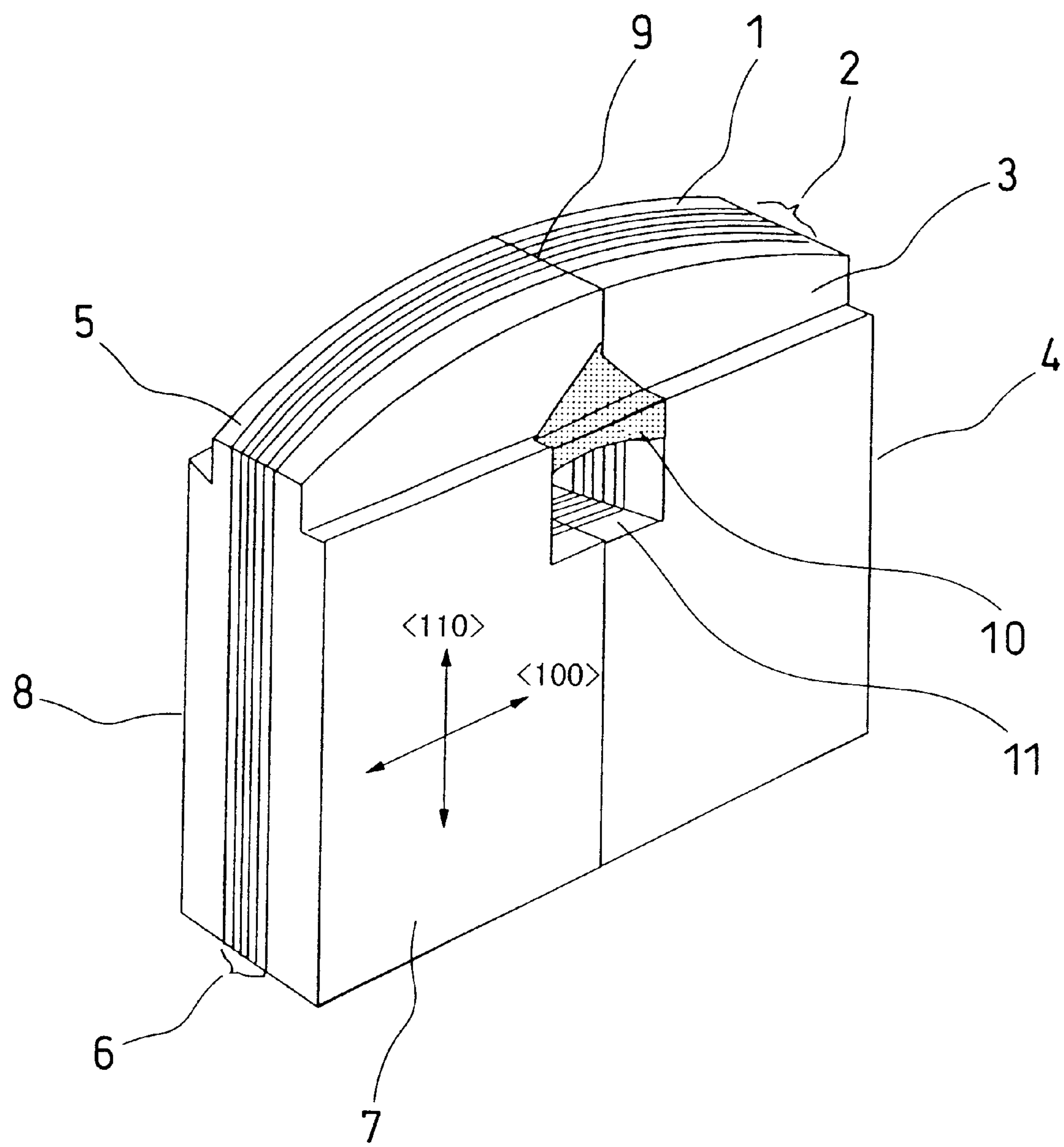
FIG. 1 is a perspective view illustrating the configuration of a magnetic head according to Embodiment 1 of the present invention.

FIG. 1 is a perspective view illustrating the configuration of a magnetic head according to Embodiment 1 of the present invention. In this magnetic head, laminated magnetic films 2 and 6, each obtained by alternatively laminating magnetic metal films such as CoNbZrTa films and non-magnetic films made of $SiO_2$, are respectively sandwiched between pairs of substrates 1, 3 and 5, 7 made of a non-magnetic single crystal ferrite material, thus forming a pair of laminated film-type magnetic core halves 4 and 8. The magnetic core halves are bonded together with the end faces of the laminated magnetic films 2 and 6 opposing each other, thereby forming a magnetic gap 9 at the bonded portion. A coil window 11 through which coils are wound also is provided in the magnetic head so as to pass through the magnetic head in its thickness direction. The reference numeral 10 denotes a bonding glass for bonding the magnetic core halves together. Further, the sliding surface of the magnetic head is set to have a predetermined sliding width in order to achieve a good contact with a magnetic tape.

The non-magnetic single crystal ferrite substrates 1, 3, 5, and 7 are constructed so that the crystal face orientation of the sliding surface of the magnetic head to be in contact with the magnetic tape is approximately {110}) and that the <110> direction is approximately in parallel with the sliding direction of the magnetic head with respect to the magnetic tape.

In the present embodiment, as the non-magnetic single crystal ferrite material, an MnZn-based non-magnetic single crystal ferrite and a TiZn-based non-magnetic single crystal ferrite are used, for example. These non-magnetic single crystal ferrites can be adjusted to have a Curie point below ordinary temperatures by selecting their compositions. Thus, they are non-magnetic at ordinary temperatures.

The present embodiment has described the case where a laminated magnetic film is formed using CoNbZrTa films as magnetic metal films and $SiO_2$ as non-magnetic films. However, FeTaN, FeAlSi, and the like also can be used for a material of the magnetic metal films, and $Al_2O_3$ and the like also can be used for a material of the non-magnetic films.

According to the first magnetic head of the invention, a still duration becomes longer since the friction phenomenon caused by the contact with the magnetic tape is reduced as compared with the case of the conventional example using a ceramic substrate. In addition, since the wear resistance of the magnetic head is improved, the lifetime of the magnetic head can be extended.

Embodiment 2

Figure 2:
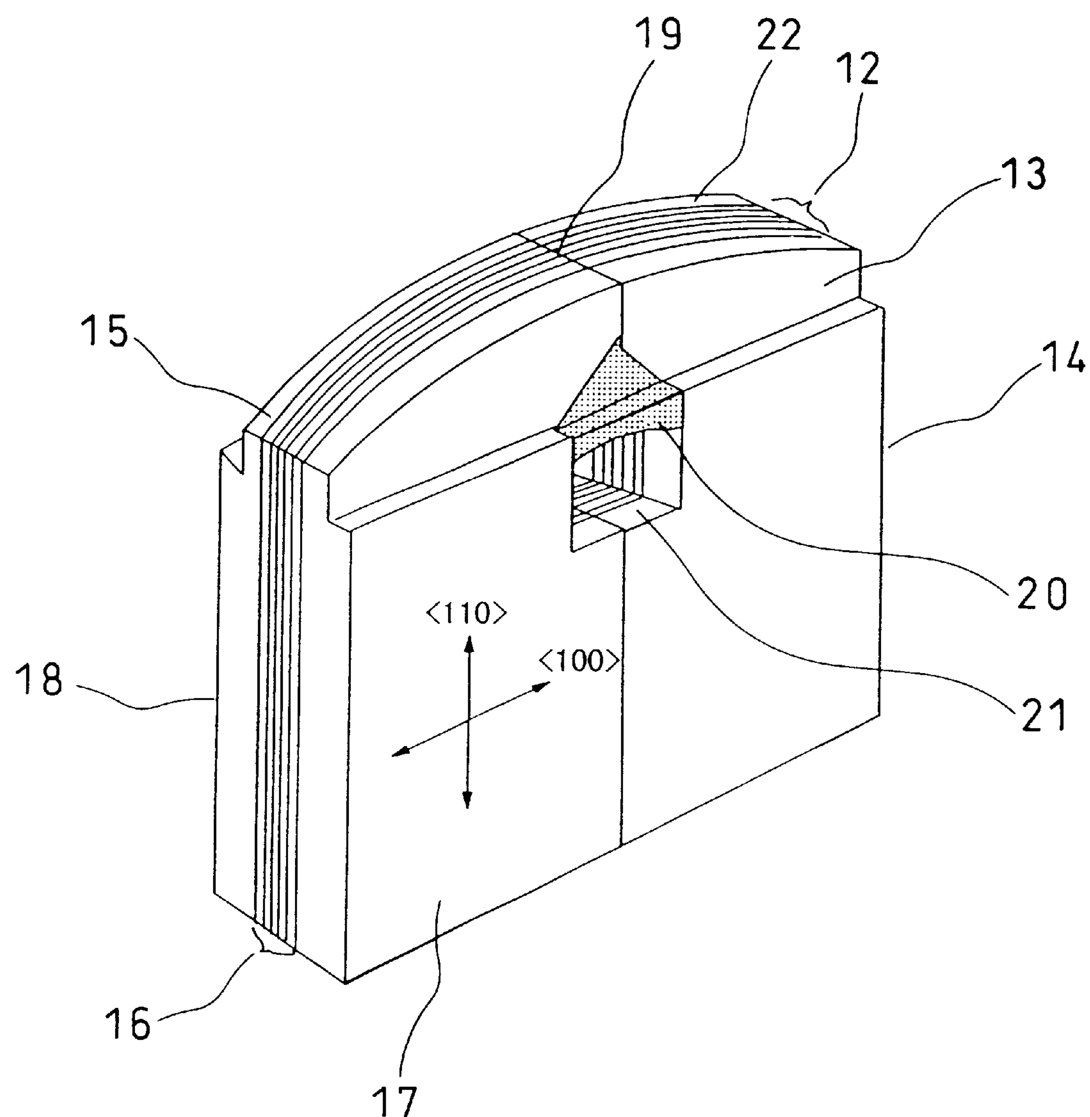
FIG. 2 is a perspective view illustrating the configuration of a magnetic head according to Embodiment 2 of the present invention.

FIG. 2 is a perspective view illustrating the configuration of a magnetic head according to Embodiment 2 of the present invention. In this magnetic head, laminated magnetic films 12 and 16, each obtained by alternatively laminating magnetic metal films such as CoNbZrTa films and non-magnetic films made of $SiO_2$, are respectively sandwiched between pairs of substrates 22, 13 and 15, 17 made of a non-magnetic single crystal ferrite material, thus forming a pair of laminated film-type magnetic core halves 14 and 18. The magnetic core halves are bonded together with the end faces of the laminated magnetic films 12 and 16 opposing each other, thereby forming a magnetic gap 19 at the bonded portion. A coil window 21 through which coils are wound also is provided in the magnetic head so as to pass through the magnetic head in its thickness direction. The reference numeral 20 denotes a bonding glass for bonding the magnetic core halves together. Further, the sliding surface of the magnetic head is set to have a predetermined sliding width in order to achieve a good contact with a magnetic tape.

The non-magnetic single crystal ferrite substrates 22, 13, 15, and 17 are constructed so that the crystal face orientation of the sliding surface of the magnetic head to be in contact with the magnetic tape is approximately {110} and that the <100> direction is approximately in parallel with the sliding direction of the magnetic head with respect to the magnetic tape.

In the present embodiment, as the non-magnetic single crystal ferrite material, an MnZn-based non-magnetic single crystal ferrite and a TiZn-based non-magnetic single crystal ferrite are used, for example. These non-magnetic single crystal ferrites can be adjusted to have a Curie point below ordinary temperatures by selecting their compositions. Thus, they are non-magnetic at ordinary temperatures.

The present embodiment has described the case where a laminated magnetic film is formed using CoNbZrTa films as magnetic metal films and $SiO_2$ as non-magnetic films. However, FeTaN, FeAlSi, and the like also can be used for a material of the magnetic metal films, and $Al_2O_3$ and the like also can be used for a material of the non-magnetic films.

According to the second magnetic head of the invention, a still duration becomes longer since the friction phenomenon caused by the contact with the magnetic tape is reduced as compared with the case of the conventional example using a ceramic substrate. In addition, since the wear resistance of the magnetic head is improved, the lifetime of the magnetic head can be extended.

COMPARATIVE EXAMPLE

The following four types of magnetic heads were prepared: a magnetic head according to Embodiment 1; a magnetic head according to Embodiment 2; as Comparative Example 1, a magnetic head having the same configuration and the same laminated magnetic film as those of the magnetic heads of Embodiments 1 and 2 except that the non-magnetic substrates are made of magnesium titanate-based ceramics; and as Comparative Example 2, a magnetic head having the same configuration and the same laminated magnetic film as those of the magnetic heads of Embodiments 1 and 2 similarly to Comparative Example 1 except that the substrate is formed of a non-magnetic single crystal ferrite material and the crystal face orientation of the ferrite material at the sliding surface to be in contact with the magnetic tape was set to be {100}. Then, a still duration, an amount of wear, and an amount of unbalanced wear (the difference in height between the substrate and magnetic film) were measured with respect to each magnetic head. This experiment was carried out using the same VTRs with the same rotary drum units, and four magnetic heads of the same type were mounted on each rotary drum unit. The relative velocity of each VTR was set to be 20 m/s. As the still duration, the time period elapsed until the level of the reproduction output from the magnetic head was lowered by 6 dB as compared with that at the initial state was measured. Further, as the amount of wear, the amounts of wear and unbalanced wear were measured after transporting a coat-type metal tape for 250 hours. The amount of unbalanced wear was measured using an atomic force microscope.

In Table 1, the still duration, amount of wear, and amount of unbalanced wear of the respective magnetic heads are expressed as a ratio, assuming that the values of Comparative Example 1 are 1.

TABLE 1

| | Comparative Example 1 | Comparative Example 2 | Embodiment 1 | Embodiment 2 |
|---|---|---|---|---|
| Still duration | 1 | 2 | 10 | 8 |
| Amount of wear | 1 | 0.3 | 0.8 | 0.5 |
| Amount of unbalanced wear | 1 | 1.5 | 0.7 | 1 |

From Table 1, it is understood that the magnetic heads according to Embodiments 1 and 2 are superior to those of Comparative Examples 1 and 2 in terms of still durability. It is also understood that the magnetic heads according to Embodiments 1 and 2 are superior to the magnetic head of Comparative Example 1 in terms of wear resistance since the amounts of wear of these magnetic heads are smaller than that of Comparative Example 1 and the amounts of unbalanced wear of these magnetic heads are equivalent to or smaller than that of Comparative Example 1.

Further, the magnetic head of Comparative Example 2 has the smaller amount of wear as compared with the magnetic heads of Embodiments 1 and 2, but it is inferior to those in the terms of the still durability and the amount of unbalanced wear. In order to reduce the spacing loss between the magnetic tape and magnetic head, the smaller unbalanced wear is desirable.

Furthermore, the magnetic head according to Embodiment 1 is superior to that of Embodiment 2 in terms of still durability while the magnetic head of Embodiment 2 is superior to that of Embodiment 1 in terms of wear resistance.

Embodiment 3

Figure 3:
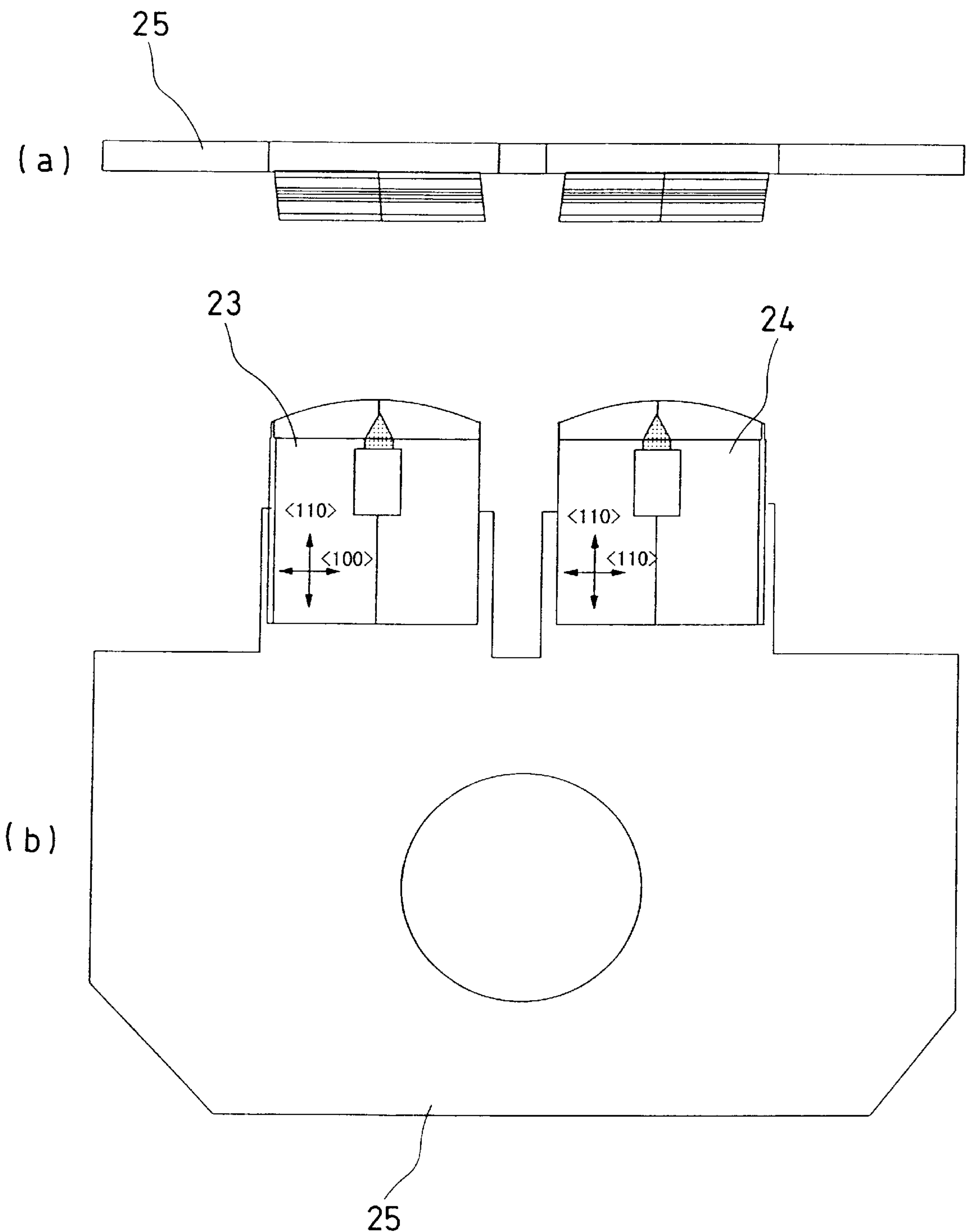
FIG. 3(*a*) is a front view illustrating the configuration of a magnetic head according to Embodiment 3 of the present invention.

FIG. 3 is an external view of a combination-type magnetic head according to Embodiment 3 of the present invention. FIG. 3(*a*) is a front view and FIG. 3(*b*) is a side view. Magnetic heads 23 and 24 are attached to a head base 25 made of brass, for example, using an ultraviolet hardening-type resin, for example. Thereafter, coils are wound around the magnetic heads (not shown in the drawings). The magnetic head 23 is the magnetic head according to Embodiment 2 and the magnetic head 24 is the magnetic head according to Embodiment 1.

This combination-type magnetic head is mounted on a drum unit in such a manner that the magnetic head 23 slides with respect to the magnetic tape prior to the magnetic head 24. By doing so, the amounts of wear in the respective magnetic heads are brought into balance. The reason for this is that, in the combination-type magnetic head according to Embodiment 3, the magnetic head 23 according to Embodiment 2 coming into contact with the magnetic tape first has better wear resistance as compared with the magnetic head 24 according to Embodiment 1 coming into contact with the magnetic tape following the magnetic head 23 as shown in Table 1 above, while, in the conventional combination-type magnetic head, the amount of wear of the magnetic head coming into contact with the magnetic tape first becomes greater. In addition, even when the tape is transported for a long time, the portions of the respective magnetic head protruding from the rotary drum reduce evenly and the contact (head touch) between the magnetic tape and magnetic head thus becomes stable.

Hereinafter, a magnetic recording/reproducing apparatus according to preferable embodiments of the present invention will be described with reference to the drawings.

Embodiment 4

Figure 4:
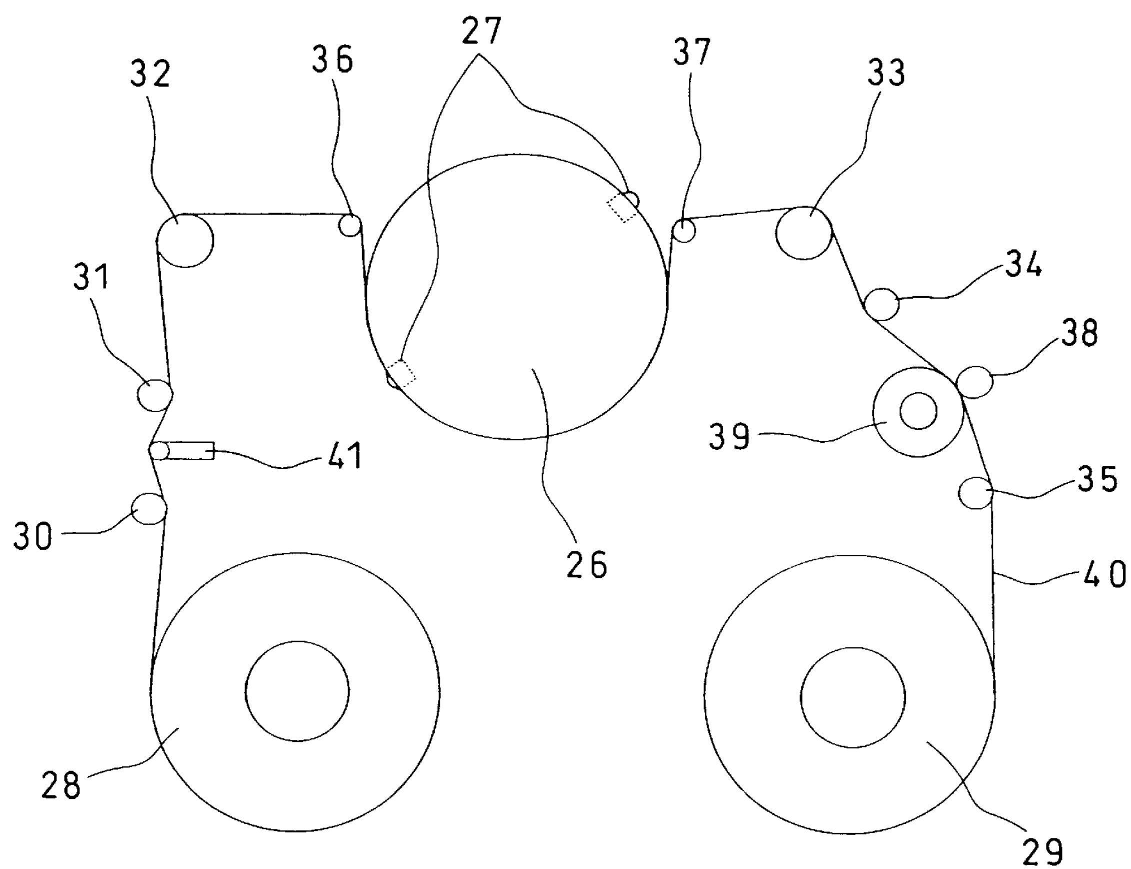
FIG. 4 is a schematic view illustrating the tape transport system in a recording/reproducing apparatus according to Embodiment 4 of the present invention.

FIG. 4 is a schematic view illustrating the tape transport system in a recording/reproducing apparatus according to Embodiment 4 of the present invention. The reference numeral 26 denotes a rotary drum unit, 27 denotes magnetic heads according to Embodiment 1 of the present invention, 28 denotes a supply reel (guide and contact mechanism), 29 denotes a take-up reel (guide and contact mechanism), 30, 31, 32, 33, 34, and 35 denote rotary posts (guide and contact mechanisms), 36 and 37 denote inclined posts (guide and contact mechanisms), 38 denotes a capstan (guide and contact mechanisms), 39 denotes a pinch roller (guide and contact mechanisms), 41 denotes a tension arm (guide and contact mechanisms), and 40 denotes a magnetic tape. The magnetic tape 40 wrapped around the supply reel 28 is transported by the pulling-in actions of the pinch roller 39 and the capstan 38 and is guided by the inclined posts 36 and 37 so as to be pressed against the magnetic heads 27 mounted on the rotary drum unit 26. The magnetic tape 40 then passes between the pinch roller 39 and capstan 38 to be wound onto the take-up reel 29. The rotary drum unit is the top rotary drum system, and the two magnetic heads 27 are mounted on the rotary drum unit 26 so as to project from its side face by 20 $\mu$m. The rotation rate of the rotary drum unit 26 is about 18000 rpm and the relative velocity thereof is about 20 m/s, for example.

The magnetic recording/reproducing apparatus having the configuration of the present embodiment has a long still duration and excellent wear resistance while the rotation rate and relative velocity of the rotary drum unit are high. A reliable magnetic recording/reproducing apparatus thus can be realized.

Embodiment 5

Figure 5:
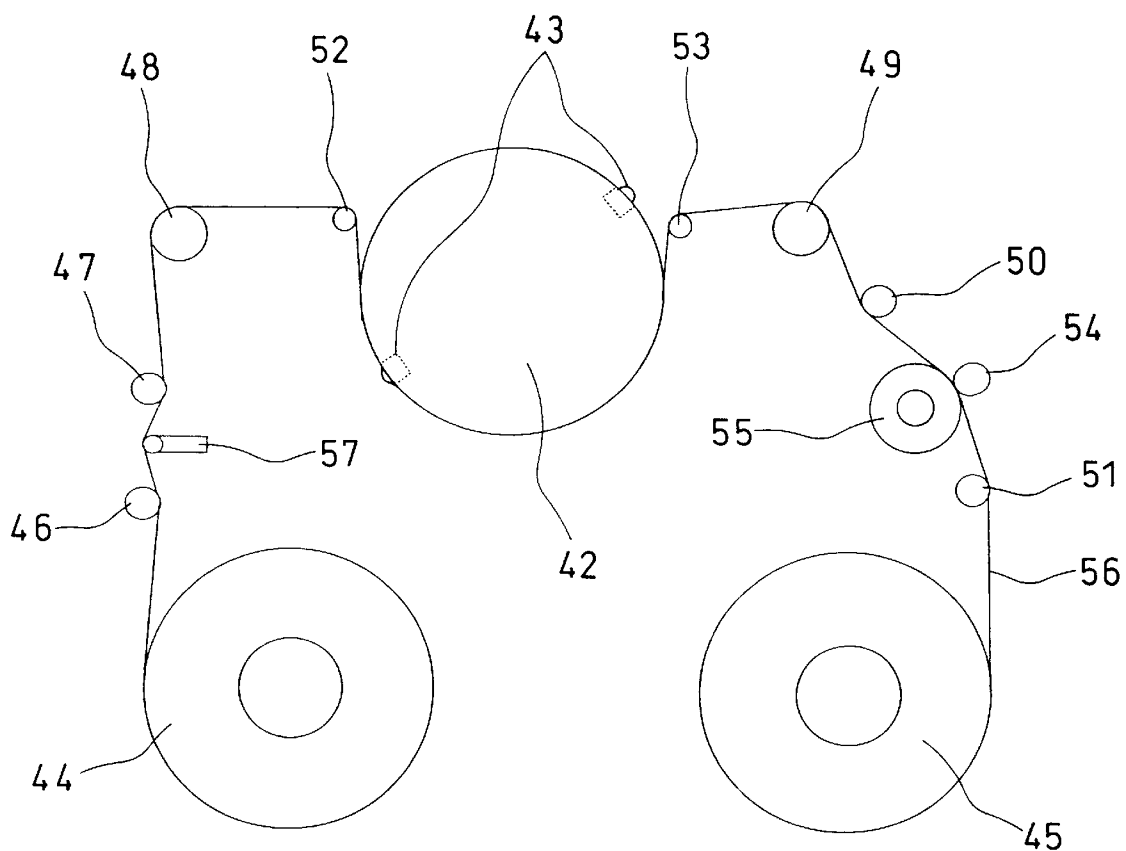
FIG. 5 is a schematic view illustrating the tape transport system in a recording/reproducing apparatus according to Embodiment 5 of the present invention.

FIG. 5 is a schematic view illustrating the tape transport system of a recording/reproducing apparatus according to Embodiment 5 of the present invention. The reference numeral 42 denotes a rotary drum unit, 43 denotes magnetic heads according to Embodiment 2 of the present invention, 44 denotes a supply reel (guide and contact mechanism), 45 denotes a take-up reel (guide and contact mechanism), 46, 47, 48, 49, 50, and 51 denote rotary posts (guide and contact mechanisms), 52 and 53 denote inclined posts (guide and contact mechanisms), 54 denotes a capstan (guide and contact mechanisms), 55 denotes a pinch roller (guide and contact mechanisms), 57 denotes a tension arm (guide and contact mechanisms), and 56 denotes a magnetic tape. The magnetic tape 56 wrapped around the supply reel 44 is transported by the pulling-in actions of the pinch roller 55 and the capstan 54 and is guided by the inclined posts 52 and 53 so as to be pressed against the magnetic heads 43 mounted on the rotary drum unit 42. The magnetic tape 56 then passes between the pinch roller 55 and capstan 54 to be wound onto the take-up reel 45. The rotary drum unit is the top rotary drum system, and the two magnetic heads 43 are mounted on the rotary drum unit 42 so as to project from its side face by 20 $\mu$m. The rotation rate of the rotary drum unit 42 is about 18000 rpm and the relative velocity thereof is about 20 m/s, for example.

The magnetic recording/reproducing apparatus having the configuration of the present embodiment has a long still duration and excellent wear resistance while the rotation rate and relative velocity of the rotary drum unit are high. A reliable magnetic recording/reproducing apparatus thus can be realized.

Embodiment 6

Figure 6:
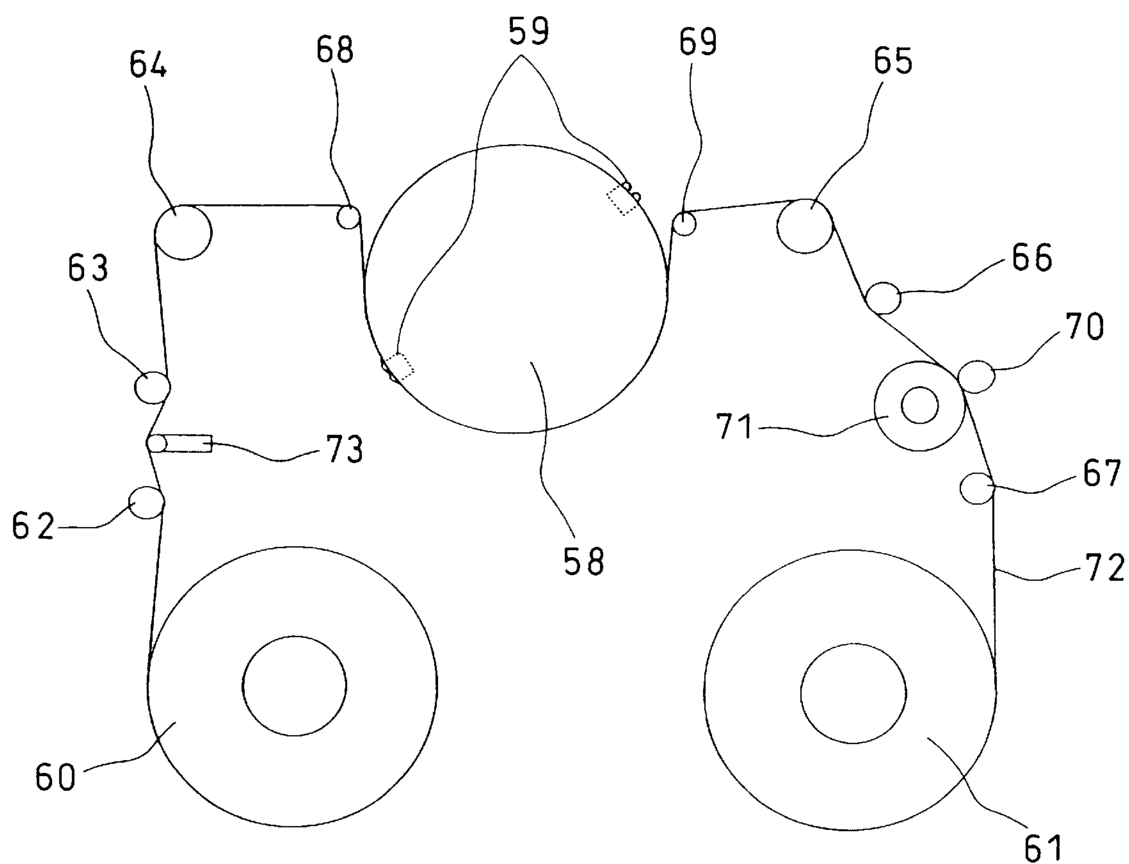
FIG. 6 is a schematic view illustrating the tape transport system in a recording/reproducing apparatus according to Embodiment 6 of the present invention.

FIG. 6 is a schematic view illustrating the tape transport system of a recording/reproducing apparatus according to Embodiment 6 of the present invention. The reference numeral 58 denotes a rotary drum unit, 59 denotes combination-type magnetic heads according to Embodiment 3 of the present invention, 60 denotes a supply reel (guide and contact mechanism), 61 denotes a take-up reel (guide and contact mechanism), 62, 63, 64, 65, 66, and 67 denote rotary posts (guide and contact mechanisms), 68 and 69 denote inclined posts (guide and contact mechanisms), 70 denotes a capstan (guide and contact mechanisms), 71 denotes a pinch roller (guide and contact mechanisms), 73 denotes a tension arm (guide and contact mechanisms), and 72 denotes a magnetic tape. The magnetic tape 72 wrapped around the supply reel 60 is transported by the pulling-in actions of the pinch roller 71 and the capstan 70 and is guided by the inclined posts 68 and 69 so as to be pressed against the magnetic heads 59 mounted on the rotary drum unit 58. The magnetic tape 72 then passes between the pinch roller 71 and capstan 70 to be wound onto the take-up reel 61. The rotary drum unit is the middle rotary drum system, and the two combination-type magnetic heads 59 are mounted on the rotary drum unit 58 so as to project from its side face by 18 $\mu$m. The rotation rate of the rotary drum unit 58 is about 18000 rpm and the relative velocity thereof is about 20 m/s, for example.

Since the magnetic recording/reproducing apparatus having the configuration of the present embodiment has a long still duration and excellent wear resistance, a reliable magnetic recording/reproducing apparatus can be realized. Further, since the difference in the amounts of wear between the magnetic head coming into contact with the tape first and the other magnetic head becomes smaller, a preferable head touch can be obtained even after the tape is transported for a long time.

The Embodiments 4, 5, and 6 of the present invention have described the case where a magnetic recording/reproducing apparatus is a VTR. However, a similar effect can be obtained even when the magnetic head of the present invention is mounted on the magnetic recording/reproducing apparatus such as a streamer.

What is claimed is:

1. A magnetic head comprising:

two magnetic core halves, each comprising at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves, wherein at least a part of a sliding surface of each substrate with respect to a magnetic tape is made of a non-magnetic single crystal ferrite material, a crystal face orientation of the non-magnetic single crystal ferrite material at the sliding surface is approximately {110}, and a <110> direction of the non-magnetic single crystal ferrite material is approximately in parallel with a sliding direction of the magnetic head with respect to the magnetic tape.

2. A magnetic head having an azimuth angle comprising:

magnetic core halves, each comprising at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves, wherein at least a part of a sliding surface of each substrate with respect to a magnetic tape is made of a non-magnetic single crystal ferrite material, a crystal face orientation of the non-magnetic single crystal ferrite material at the sliding surface is approximately {110}, and a <100> direction of the non-magnetic single crystal ferrite material is approximately in parallel with a sliding direction of the magnetic head with respect to the magnetic tape.

3. A magnetic recording/reproducing apparatus comprising:

a rotary drum unit having a magnetic head comprising:

two magnetic core halves, each comprising at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves.

wherein at least a part of a sliding surface of each substrate with respect to a magnetic tape is made of a non-magnetic single crystal ferrite material, a crystal face orientation of the non-magnetic single crystal ferrite material at the sliding surface is approximately {110}, and a<110> direction of the non-magnetic single crustal ferrite material is approximately in parallel with a sliding direction of the magnetic head with respect to the magnetic tape, and a guide and contact mechanism for guiding a magnetic tape into the rotary drum unit and keeping the magnetic tape in contact with outer peripheral surfaces of a fixed drum and a rotary drum.

4. A magnetic recording/reproducing apparatus comprising:

a rotary drum unit having a magnetic head having an azimuth angle comprising:

magnetic core halves each comprising at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves, wherein at least a part of a sliding surface of each substrate with respect to a magnetic tape is made of a non-magnetic single crystal ferrite material, a crystal face orientation of the non-magnetic single crystal ferrite material at the sliding surface is approximately {110}, and a <100> direction of the non-magnetic singe crystal ferrite material is approximately in parallel with a sliding direction of the magnetic head with respect to the magnetic tape, and a guide and contact mechanism for guiding a magnetic tape into the rotary drum unit and keeping the magnetic tape in contact with outer peripheral surfaces of a fixed drum and a rotary drum.

5. A magnetic recording/reproducing apparatus comprising:

a rotary drum unit having a combination-type magnetic head comprising:

a head base;

a first magnetic head comprising:

two Magnetic core halves, each comprising at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves, wherein at least a part of a sliding surface of each substrate with respect to a magnetic tape is made of a non-magnetic single crystal ferrite material, a crystal face orientation of the non-magnetic single crystal ferrite material at the sliding surface is approximately {110}, and a <110> direction of the non-magnetic single crystal ferrite material is approximately in parallel with a sliding direction of the magnetic head with respect to the magnetic tape; and a second magnetic head having an azimuth angle comprising:

magnetic core halves, each comprising at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves, wherein at least a part of a sliding surface of each substrate with respect to a magnetic tape is made of a non-magnetic singe crystal ferrite material, a crystal face orientation of the non-magnetic single crystal ferrite material at the sliding surface is approximately {110}, and a <100> direction of the non-magnetic single crystal ferrite material is approximately in parallel with a sliding direction of the magnetic head with respect to the magnetic tape;

the first and second magnetic heads being mounted on said head base, and a guide and contact mechanism for guiding a magnetic tape into the rotary drum unit and keeping the magnetic tape in contact with outer peripheral surfaces of a fixed drum and a rotary drum.

6. A combination-type magnetic head comprising:

a head base;

a fist magnetic head comprising:

two magnetic core halves, each comprising at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves, wherein at least a-part of a sliding surface of each substrate with respect to a magnetic tape is made of a non-magnetic single crystal ferrite material, a crystal face orientation of the non-magnetic single crystal ferrite material at the sliding surface is approximately {110}, and a <110> direction of the non-magnetic single crystal ferrite material is approximately in parallel with a sliding direction of the magnetic head with respect to the magnetic tape; and a second magnetic head having an azimuth angle comprising:

magnetic core halves, each comprising at least one magnetic film made of a soft magnetic metallic material and a pair of substrates sandwiching the magnetic film, arranged so that end faces thereof oppose each other with a magnetic gap being formed therebetween to form a magnetic path by the magnetic film in each of the magnetic core halves, wherein at least a part of a sliding surface of each substrate with respect to a magnetic tape is made of a non-magnetic single crystal ferrite material, a crystal face orientation of the non-magnetic single crystal ferrite material at the sliding surface is approximately {110}, and a <100> direction of the non-magnetic single crystal ferrite material is approximately in parallel with a sliding direction of the magnetic head with respect to the magnetic tape;

the first and second magnetic heads being mounted on said head base.

7. A combination-type magnetic head according to claim 6, wherein the second magnetic head is arranged so that the second magnetic head comes into contact with a magnetic tape prior to the first magnetic head.

* * * * *